(12) United States Patent
Stockmaster et al.

(10) Patent No.: US 9,500,483 B1
(45) Date of Patent: Nov. 22, 2016

(54) SURROGATE NAVIGATION RECEIVER FOR TRANSFERRING CAPABILITIES TO A HOST NAVIGATION RECEIVER AND RELATED METHOD

(71) Applicant: Rockwell Collins, Inc., Cedar Rapids, IA (US)

(72) Inventors: Michael H. Stockmaster, Cedar Rapids, IA (US); Donald A. Stratton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 501 days.

(21) Appl. No.: 14/064,488

(22) Filed: Oct. 28, 2013

(51) Int. Cl.
| | |
|---|---|
| *G01S 19/03* | (2010.01) |
| *G01S 19/13* | (2010.01) |
| *G01S 19/42* | (2010.01) |
| *G01C 21/00* | (2006.01) |
| *G01S 19/38* | (2010.01) |
| *G01S 19/39* | (2010.01) |
| *G01S 19/00* | (2010.01) |

(52) U.S. Cl.
CPC ............. *G01C 21/00* (2013.01); *G01S 19/03* (2013.01); *G01S 19/13* (2013.01); *G01S 19/38* (2013.01); *G01S 19/39* (2013.01); *G01S 19/42* (2013.01)

(58) Field of Classification Search
CPC ..... G01C 21/00; G01S 19/01; G01S 19/015; G01S 19/03; G01S 19/07; G01S 19/09; G01S 19/10; G01S 19/13; G01S 19/14; G01S 19/21; G01S 19/24; G01S 19/25; G01S 19/05; G01S 19/35; G01S 19/36; G01S 19/37; G01S 19/38; G01S 19/39; G01S 19/42; G01S 19/43; G01S 19/44; H04W 64/00

See application file for complete search history.

(56) References Cited

U.S. PATENT DOCUMENTS

| | | | | |
|---|---|---|---|---|
| 5,786,790 A * | 7/1998 | Abbott | ................. | G01S 19/07 342/357.31 |
| 5,877,725 A * | 3/1999 | Kalafus | ................. | G01S 19/07 342/357.31 |
| 6,185,427 B1 * | 2/2001 | Krasner | ................. | G01S 19/07 342/357.24 |
| 6,326,916 B1 * | 12/2001 | Green | ................. | G01S 19/07 342/357.44 |
| 6,430,503 B1 * | 8/2002 | McBurney | ............. | G01S 19/36 342/357.46 |
| 6,469,663 B1 * | 10/2002 | Whitehead | ............. | G01S 19/44 342/357.31 |
| 6,584,404 B1 * | 6/2003 | McBurney | ............. | G01S 19/09 701/482 |
| 6,961,018 B2 * | 11/2005 | Heppe | ................. | G01S 19/07 342/357.34 |

(Continued)

FOREIGN PATENT DOCUMENTS

| | | | |
|---|---|---|---|
| WO | WO99/18677 A1 * | 4/1999 | |
| WO | WO01/63314 A1 * | 8/2001 | |

*Primary Examiner* — Bernarr Gregory
(74) *Attorney, Agent, or Firm* — Angel N. Gerdzhikov; Donna P. Suchy; Daniel M. Barbieri

(57) ABSTRACT

An integrated surrogate positioning system and method is disclosed for converting a received positioning signal to a desired output based on existing infrastructure of a host receiver. The system and method comprises a signal processing system for receiving and downconverting to digital, radio frequency positioning signals from a variety of constellations. A radio frequency signal generator receives the positioning solution and determines output positioning signal parameters based on the requirements of the host receiver. The signal generator produces an output baseband positioning signal based on the received positioning solution and the output positioning signal parameters and transmits the positioning signal to the host receive through existing infrastructure.

20 Claims, 5 Drawing Sheets

(56) References Cited

U.S. PATENT DOCUMENTS

| | | | |
|---|---|---|---|
| 7,076,256 B1 * | 7/2006 | Orler | H04W 64/00 455/455 |
| 7,574,215 B1 * | 8/2009 | Fan | G01S 19/05 342/357.42 |
| 8,138,970 B2 * | 3/2012 | Whitehead | G01S 19/14 342/357.27 |
| 8,193,977 B1 * | 6/2012 | Ryan | G01S 19/03 342/357.4 |
| 8,768,617 B2 * | 7/2014 | Colley | G01S 19/13 342/357.21 |
| 8,880,001 B1 * | 11/2014 | Hwang | G01S 19/14 455/404.2 |
| 8,954,269 B2 * | 2/2015 | Yamamoto | G01S 19/37 340/539.11 |

\* cited by examiner

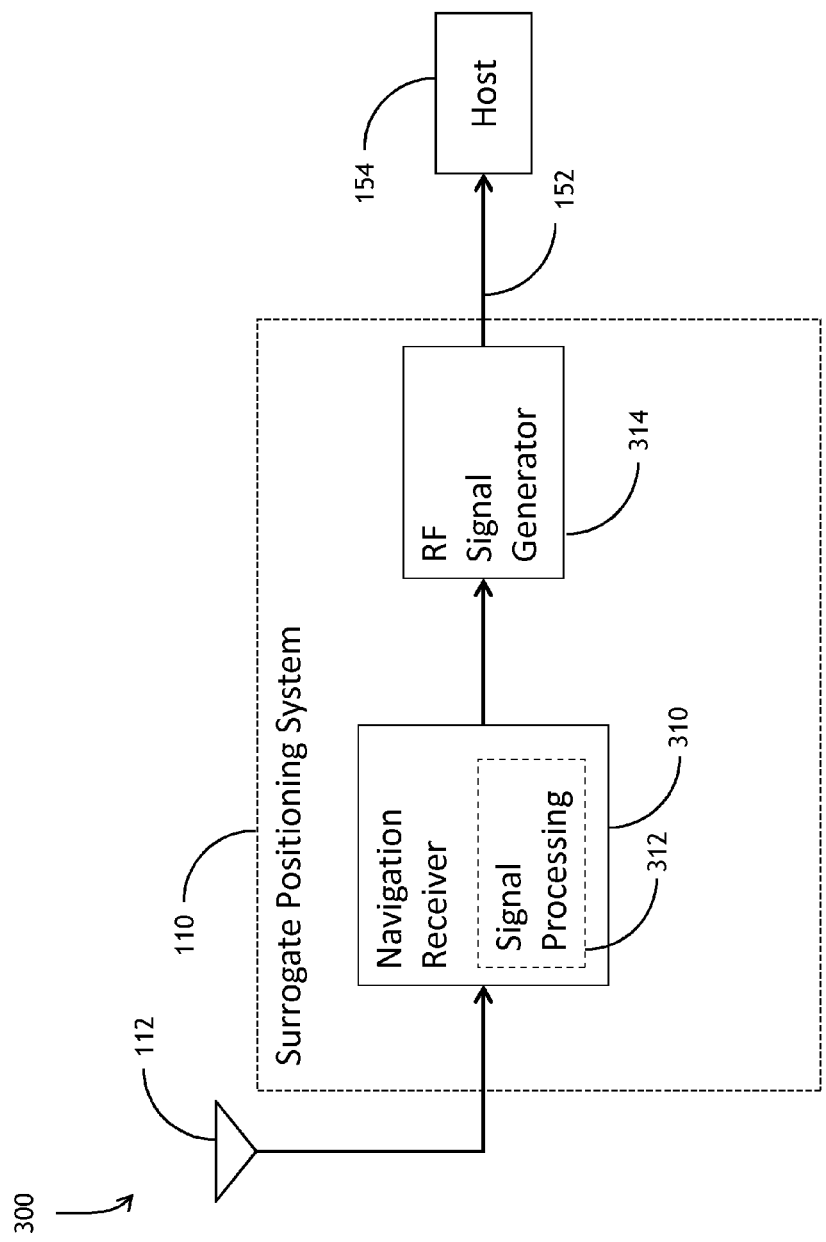

SURROGATE NAVIGATION RECEIVER FOR TRANSFERRING CAPABILITIES TO A HOST NAVIGATION RECEIVER AND RELATED METHOD

FIELD OF THE INVENTION

The present invention relates generally to enhancement of capabilities of existing hardware associated with reception of space based positioning signals. More particularly, embodiments of the present invention relate to a system and method for transferring a capability from a surrogate positioning system to a host positioning system via existing host infrastructure without alteration to the existing infrastructure.

BACKGROUND OF THE INVENTION

Installation of new hardware onboard a platform to perform a specific task is often a greater expense than an operator may desire. For example, integration costs of rewiring an aircraft to install an upgraded Global Navigation Satellite System (GNSS) positioning system are, in many cases, prohibitive. An existing GNSS receiver may be 1) sufficient in terms of its performance, 2) fully integrated with the onboard systems such that integrators have little motivation to upgrade the receiver.

Positioning system Anti-Jam (AJ) performance may be one characteristic the operator may prefer to upgrade. However, existing systems inherit limitations from the associated infrastructure. For example, traditional platforms may have an existing federated positioning system receiver and navigation function in which the operator has heavily invested. The cost of system integration and qualification for a new integrated GNSS system are seen as prohibitive or impossible to justify (e.g. re-wiring an aircraft for new functionality). Moreover, an existing federated interface may be bandwidth limited and unable to support transferring the desired signals or information from the AJ system to the positioning system.

To improve AJ performance, traditional applications tend to employ an analog or digital nuller located at the antenna to provide a protected Radio Frequency (RF) signal to the existing positioning system receiver in the aircraft using the existing coaxial cable that was previously connected to a Fixed Radiation Pattern Antenna (FRPA).

In some traditional systems, a digital interface AJ and GPS is used where the multi-beam output from the AJ system located near the antenna is fed serially through the existing coax. However, this approach also 1) has bandwidth limitations that restrict the number of digital beams that maybe be provided to the GPS receiver and 2) may implement a proprietary interface between the AJ and GPS that may require them to be installed in pairs. The bandwidth limitation is exacerbated when Military Signal (M-Code) receivers begin operation as each beam now requires additional bandwidth.

Modernized GNSS upgrades to existing infrastructure may be an additional goal for the operator. Modernized GNSS capabilities (e.g., M-Code) to existing system infrastructure may be desirable for certain operators. Integrating AJ with modernized GNSS has additional barriers beyond those associated with integrations. As discussed above, federated AJ solutions with a digital beam interface for modernized GNSS will require more bandwidth, exacerbating limitations associated with the current AJ to GNSS receiver interface. In addition, modernized GNSS will require specialized integration of modernized anti-spoofing with GNSS AJ. This integration challenge may act to deter operators from equipping platforms with AJ solutions in the near term.

Similar to the above example of AJ capabilities, there are several significant characteristics of existing GNSS receivers which may require enhancement to remain a viable GNSS receiver. New GNSS constellations are becoming available which emit signals that some existing GNSS installed receivers are unable to process. Military operators may desire to operate GNSS receivers with only civilian GNSS signal reception capabilities due to their exemplary user interface characteristics. In addition, military operators may procure a civilian or civilian-based vehicle previously configured with an installed and fully integrated civilian GNSS receiver. There is increasing concern that civilian and military receivers may be subject to attack by spoofing systems which corrupt or emulate one of more of the existing receivers expected positioning signals, which may corrupt the positioning capabilities of the existing receiver.

Consequently, a need exists for an effective system and method for transferring enhanced capabilities of a surrogate receiver to a host receiver via existing host infrastructure without alteration to the existing host infrastructure.

SUMMARY OF THE INVENTION

Accordingly, an embodiment of the present invention is directed to a surrogate positioning system for a surrogate positioning system for transferring a positioning solution to a host positioning system, comprising: a navigation receiver configured for: receiving radio frequency positioning signals; converting the received radio frequency positioning signals to digital positioning signals; optionally applying signal processing to improve properties of the digital positioning signals; acquiring and tracking the received digital positioning signals; optionally applying signal processing to improve the acquired and tracked digital positioning signals; determining a surrogate positioning solution based on the received digital positioning signals, the surrogate positioning solution further based on properties of the received positioning signal and associated signal processing; configuring the surrogate positioning solution for output; a radio frequency signal generator configured for; receiving the surrogate positioning solution from the navigation receiver; determining output positioning signal parameters based on the received surrogate positioning solution and parameters of the host positioning system, the determining including a transfer of properties of the surrogate positioning system to the host positioning system; generating an output baseband positioning signal based on the received surrogate positioning solution and the output positioning signal parameters, the output baseband positioning signal including the properties of the surrogate positioning system and configured for transmission to the host positioning system via an existing infrastructure, the output baseband positioning signal further configured for reception by the host receiver, the output baseband positioning signal providing a capability for the host receiver to calculate a host positioning solution with the properties of the surrogate positioning system; upconverting the output baseband positioning signal to a radio frequency positioning signal, the radio frequency positioning signal based on the existing infrastructure; and communicating the radio frequency positioning signal via the existing infrastructure to at least one host receiver.

An additional embodiment of the present invention may provide a system where the existing infrastructure is coaxial cable routed within a vehicle and the received positioning signal is at least one of: a Global Positioning System signal, a GLONASS signal, an external augmentation system signal such as a Wide Area Augmentation System (WAAS), a Galileo signal, a BeiDou Satellite Navigation System signal, a COMPASS, an Indian Regional Navigational Satellite System signal and a Quasi-Zenith Satellite System signal.

An additional embodiment of the present invention may provide a system where navigation receiver is further configured for coherently processing multiple radio frequency signal threads in an AJ mode through adaptive nulling and digital beamsteering and the output positioning signal parameters further comprise at least one of: a frequency, a frequency band, a power level, a modulation, a bandwidth, a Frequency Division Multiple Access (FDMA), a Code Division Multiple Access (CDMA), a Time Division Multiple Access (TDMA) and a Pseudo Random Noise (PRN) sequence.

An additional embodiment of the present invention may provide a system where the navigation receiver is further configured for anti-tamper, the navigation receiver further configured for decode a cryptographic signal and the host receiver is configured to determine a host positioning solution based on signals from at least one of: the Global Positioning System, the GLONASS, the external augmentation system, the Galileo, the BeiDou Satellite Navigation System, the COMPASS, the Indian Regional Navigational Satellite System signal and the Quasi-Zenith Satellite System signal.

An additional embodiment of the present invention may provide a navigation receiver further configured for signal processing including at least one anti-spoofing technique.

An additional embodiment of the present invention may provide a method for transferring a positioning solution from a surrogate positioning system to a host positioning system, comprising: receiving radio frequency positioning signals via a navigation receiver, converting the received radio frequency positioning signals to digital positioning signals, optionally applying signal processing to improve properties of the digital position signals, acquiring and tracking the received digital positioning signals, optionally applying signal processing to improve the acquired and tracked digital positioning signals, determining a surrogate positioning solution based on the received digital positioning signals, the surrogate positioning solution further based on properties of the received positioning signal and associated signal processing, configuring the surrogate positioning solution for output, receiving the surrogate positioning solution from the navigation receiver to a radio frequency signal generator, determining output positioning signal parameters based on the received surrogate positioning solution and parameters of the host positioning system, the determining including a transfer of properties of the surrogate positioning system to the host positioning system, generating an output baseband positioning signal based on the received surrogate positioning solution and the output positioning signal parameters, the output baseband positioning signal including the properties of the surrogate positioning system and configured for transmission to the host positioning system via an existing infrastructure, the output baseband positioning signal further configured for reception by the host receiver, the output baseband positioning signal providing a capability for the host receiver to calculate a host positioning solution with the properties of the surrogate positioning system, upconverting the output baseband positioning signal to a radio frequency positioning signal, the radio frequency positioning signal based on the existing infrastructure, and communicating the radio frequency positioning signal via the existing infrastructure to at least one host receiver.

An additional embodiment of the present invention may provide a method for method for transferring a positioning solution from a surrogate positioning system to a host positioning system, comprising: means for receiving radio frequency positioning signals, means for converting the received radio frequency positioning signals to digital positioning signals, means for optionally applying signal processing to improve properties of the digital positioning signals, means for acquiring and tracking the digital positioning signals, means for optionally applying signal processing to improve the acquired and tracked digital positioning signals, means for determining a surrogate positioning solution based on the digital positioning signals, the surrogate positioning solution further based on properties of the digital positioning signal and associated signal processing, means for determining output positioning signal parameters based on the surrogate positioning solution and parameters of a host positioning system, the determining including a means for a transfer of properties of the surrogate positioning solution to a host positioning solution, means for generating an output baseband positioning signal based on the surrogate positioning solution and the output positioning signal parameters, the output baseband positioning signal including the properties of the surrogate positioning solution configured for transmission to the host positioning system, the output baseband positioning signal further configured for reception by the host positioning system, the output baseband positioning signal configured for providing a capability for the host positioning system to calculate a host positioning solution with the properties of the surrogate positioning solution, means for upconverting the output baseband positioning signal to a radio frequency positioning signal, the radio frequency positioning signal based on the host positioning system, and means for communicating the radio frequency positioning signal to at least one host positioning system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 is a diagram of a surrogate navigation receiver illustrative of an embodiment of the present invention.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system and related method for an integrated architecture surrogate receiver capable of reception of modernized GNSS signals and able to resist positioning signal jamming and/or spoofing attempts while delivering a signal to traditional positioning systems via traditional system infrastructure.

Embodiments herein may achieve benefits from tracking additional GNSS constellations without changing the existing hardware installation. For example, the surrogate receiver may process exemplary GLONASS, Galileo, and/or GPS signals and provide a signal to a host receiver originally designed for BeiDou. Similarly, the surrogate receiver may process commercial GPS signals and supply a positioning signal recognizable by a host originally designed for GLONASS. In one embodiment, a surrogate military receiver may provide signals derived from secure processing to a civilian platform.

Figure 1:
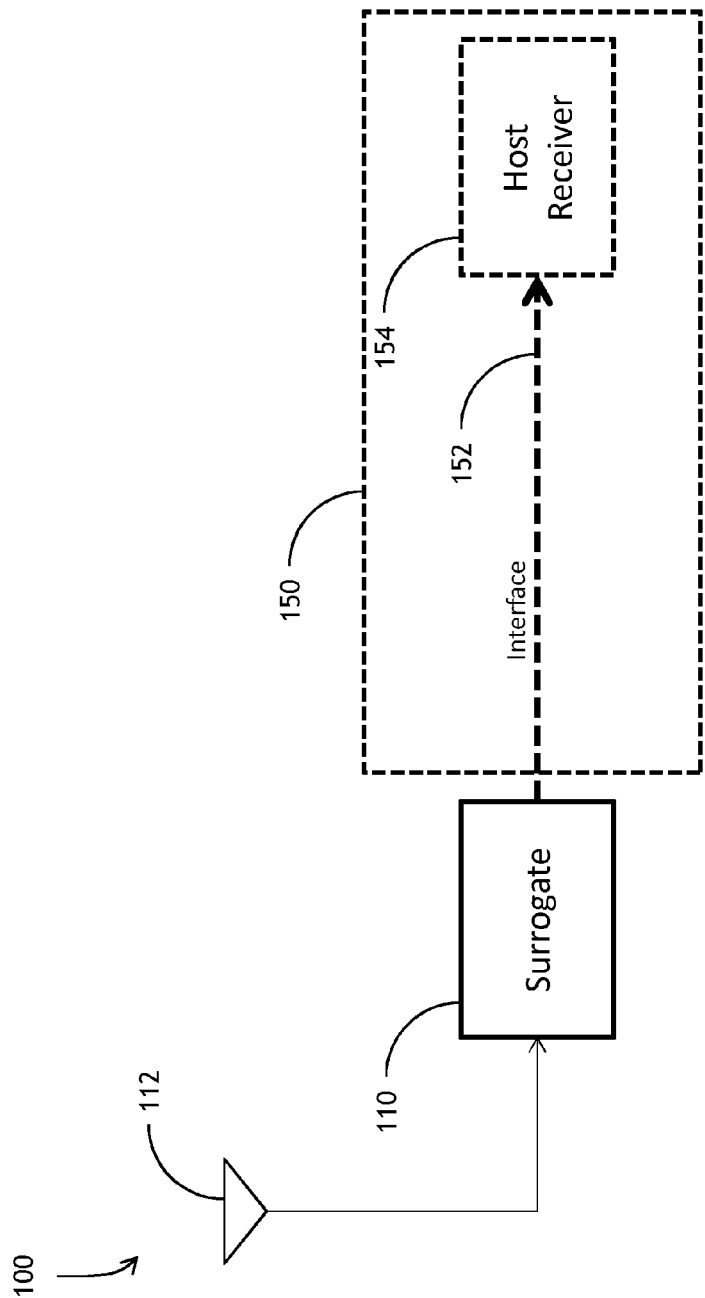
FIG. 1 is a diagram of a system for transferring a positioning solution from a surrogate positioning system to a host positioning system illustrative of an embodiment of the present invention.

Referring to FIG. 1, a diagram of a system for transferring a positioning solution from a surrogate positioning system to a host positioning system illustrative of an embodiment of the present invention is shown. System 100 may comprise an antenna 112 for receiving a plurality of signals. Surrogate 110 may operate as to transfer a surrogate positioning signal and capabilities therein to host receiver 154 via infrastructure 152. System 150 may include systems incorporated within and nested such that replacement may be difficult and time consuming.

Embodiments of the present invention may provide an upgrade path to modernized GNSS using existing infrastructure including use of a coaxial input to a GNSS receiver. For example, a civilian receiver acting as a host receiver may receive output baseband positioning signals from a surrogate navigation receiver enabling the civilian host positioning capabilities associated with modernized GNSS. In additional examples, embodiments of the present invention may provide enhanced GNSS capabilities realized by a surrogate receiving and processing 1.57542 GHz (L1 signal), 1.2276 GHz (L2 signal) and 1.17645 GHz (L5 signal) L1, L2 and L5 positioning signals and the associated properties and benefits inherent to the upgraded signals. The surrogate then may generate and transmit a highly accurate upconverted output baseband positioning signal (e.g., a RF signal simulating L1) recognizable by a host positioning system.

Moreover, a Coarse Acquisition (C/A) code positioning system receiver may realize the benefit of embodiments herein. The RF signal generator may generate a C/A code signal based on the Surrogate reception of several more accurate signals (e.g., L1 C and L1 Y, L2 C and Y, and L5). The C/A receiver may then receive and process the C/A output baseband positioning signal and determine an effective positioning solution applicable to the associated integrated onboard systems.

Embodiments of the present invention may provide a specific solution for a specific GPS receiver. For example, an aircraft landing system requiring specific accuracy requirements may benefit from embodiments of the present invention. An exemplary Joint Precision Approach and Landing System (JPALS) requires specific accuracy for successful employment. JPALS systems may employ a special type of AJ processing to ensure sufficient accuracy. Embodiments herein may receive GPS signals and process using AJ techniques compatible with JPALS providing output signals, configured for the systems such that the installation is in compliance with the accuracy and AJ performance requirements of the JPALS. This transfer of accuracy from the surrogate receiver to the host receiver may provide the specific accuracy solution required by such systems.

Embodiments of the present invention may provide improved capability to the host receiver. Non-limiting exemplary capabilities transferrable to the host receiver may include improved multipath reduction, JPALS-compliant tracking performance, improved signal availability, mitigation of spoofing, improved measurement accuracy and additional GNSS signal reception. The present invention may also enable integrated AJ performance in the existing federated receiver architecture, leaving the existing architecture and host receiver as-is, transferring the AJ benefit, realized at the surrogate, to the host receiver via an output RF or output baseband positioning signals from surrogate to host.

For example, should an adversary activate a proximal L1 jamming device, embodiments of the present invention may enable reception of highly accurate positioning signal reception by the surrogate receiver of (e.g., M-code, L2 and L5) signals supplied to the receiver through the surrogate host. Even though the L1 signal may be jammed, the surrogate host receives the L2 and L5 signals and generates a simulated L1 signal recognizable by the receiver.

Embodiments of the present invention may permit more advanced anti-spoofing techniques to be applied making the existing installed receiver more resilient to spoofing. For example, if the adversary activates one or more spoofing devices which would corrupt the positioning of the existing installed receiver, an exemplary embodiment of the present invention may employ pre-correction and/or post correction anti-spoofing techniques to the received signals and provide, to the existing installed receiver, output positioning signals which are free from, and/or possess properties of reduced vulnerability to the active spoofing devices.

Embodiments of the present invention may also provide signal reception of a plurality of GNSS type transmissions, determine which of the transmissions is free from jamming, and output the interference free signal as the output baseband positioning signal to the receiver in the frequency band recognizable by the receiver. For example, each GNSS constellation including, but not limited to Global Positioning System (GPS) (USA), GLONASS (Russia), an external augmentation system such as the WAAS (US), Galileo (European Union), BeiDou Satellite Navigation System (BDS) (China), COMPASS (China), Indian Regional Navigational Satellite System (IRNSS) and Quasi-Zenith Satellite System (QZSS) (Japan) may provide positioning signals recognizable by the surrogate receiver of the present invention. Should one or more of the signals emitted by one or more constellations suffer a jamming event, the surrogate receiver may select another of the constellations and/or a combination of constellations to determine a precise surrogate positioning solution available to the host.

Embodiments of the present invention may also provide a highly accurate positioning signal to a brand of receiver separate from the brand of antenna or transmission infrastructure. For example, a GPS receiver designed and manufactured by a first entity may be configured to receive and process a specific type of signal. The present invention may receive a plurality of signal types and supply an output baseband positioning signal recognizable by the specific brand of host.

Figure 2:
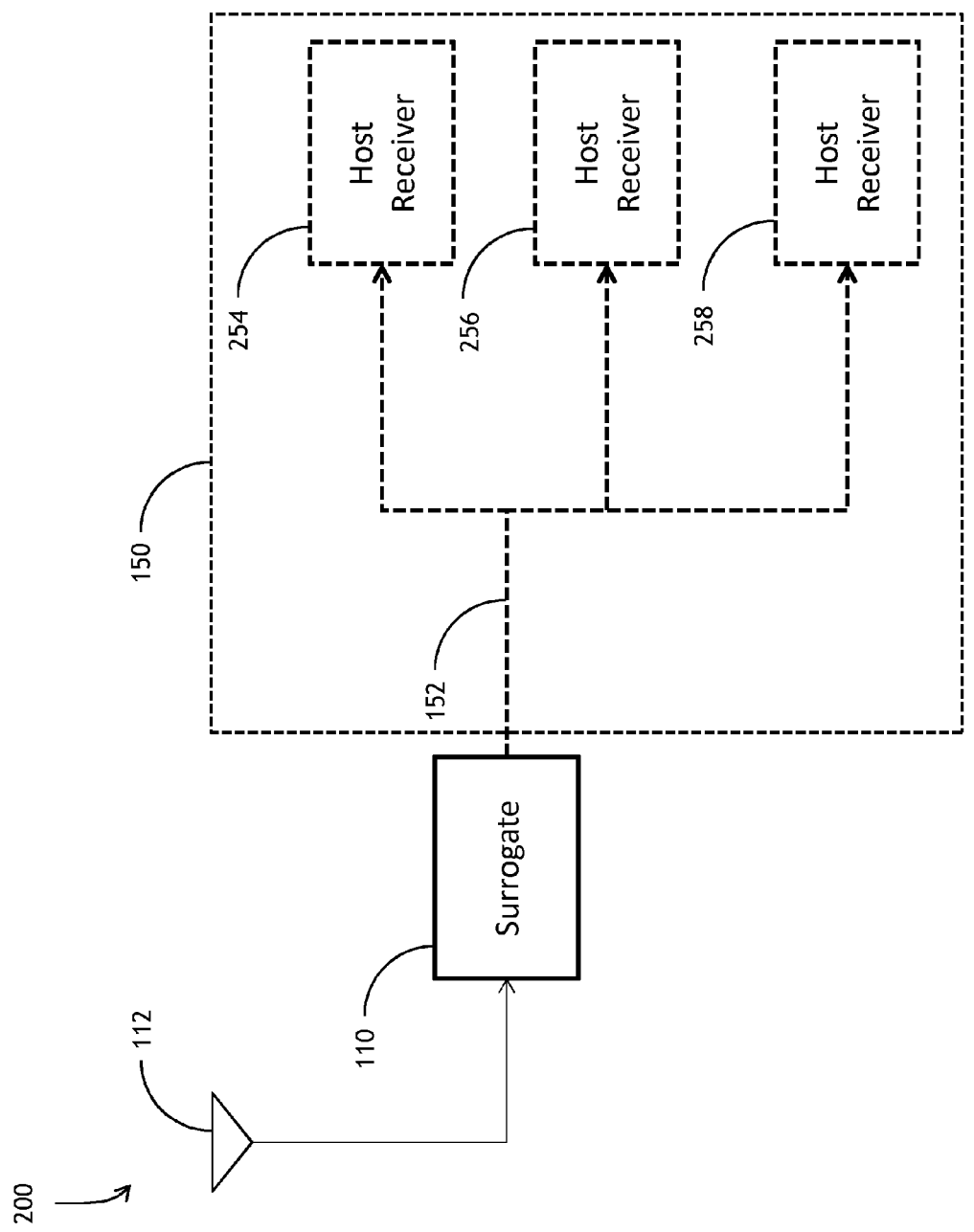
FIG. 2 is a diagram of a system for transferring a positioning solution from a surrogate positioning system to multiple host positioning systems illustrative of an embodiment of the present invention.

Referring to FIG. 2, a diagram of a system for transferring a positioning solution from a surrogate positioning system to multiple host positioning systems illustrative of an embodiment of the present invention is shown. Preferably, one embodiment of the present invention may include a plurality of host receivers 254, 256, 258 configured to receive positioning signals and provide a positioning solution based on the received signals. Surrogate 110 may provide a modernized signal via existing infrastructure 152 to systems effectively transferring capabilities of surrogate 110 to each of the hosts 254-258.

Embodiments of the present invention may provide an output baseband positioning signal available to a plurality of positioning systems 154 via infrastructure 152. System 200 may provide multiple-RE output AJ solutions feeding a plurality of RF input receivers 154. This solution allows for high-end GPS AJ performance associated with beamforming to be incorporated into a distributed GPS system.

Embodiments herein may provide the output baseband positioning signal to a plurality of host receiver types. An exemplary receiver of a Galileo positioning system may function receiving the output baseband positioning signals based on signals received from an exemplary GLONASS constellation. System 200 makes independent the type and brand of constellation and the type and brand of receiver system employed.

Referring to FIG. 3, a diagram of a surrogate navigation receiver illustrative of an embodiment of the present invention is shown. One embodiment of the present invention may include a surrogate positioning system 110 including navigation receiver 310 and optional signal processing 312. Navigation receiver 310 may function to receive RF positioning signals via antenna 112 and determine a positioning solution based on the received signals. RF signal generator 314 may receive the surrogate positioning solution from the navigation receiver 310 and determine output positioning signal parameters based on the surrogate positioning solution and parameters of the host positioning system 154. In this operation, enhanced properties of the surrogate positioning system 110 are transferred to the host 154 using existing infrastructure 152.

RF signal generator 314 may function to generate an output baseband positioning signal based on the received surrogate positioning solution and the output positioning signal parameters. Here, the output baseband positioning signal may include the properties of the surrogate positioning system and configured for transmission to the host positioning system via an existing infrastructure 152. Preferably, the output baseband positioning signal is configured for reception by the host receiver 154 and provides the capability for the host receiver 154 to calculate a host positioning solution with the properties of the surrogate positioning system 110. After the signal is generated, surrogate positioning system 110 upconverts the output baseband positioning signal to a radio frequency positioning signal based on the capabilities of the existing infrastructure 152. Finally, the radio frequency positioning signal is communicated via the existing infrastructure 152 to at least one host receiver 154.

Embodiments of the present invention remove bandwidth limits of the infrastructure. The number of GNSS protected/tracked is no longer limited by the interface bandwidth. System 200 shifts the limitation from interface bandwidth to the surrogate navigation receiver.

System 300 may provide additional capabilities to a host 154. For example, a civilian host 154 may receive an unencrypted signal based on surrogate 110 reception of an encrypted signal. The host 154 need not be subject to a keying requirement to enable system 300 to provide this input.

Figure 4A:
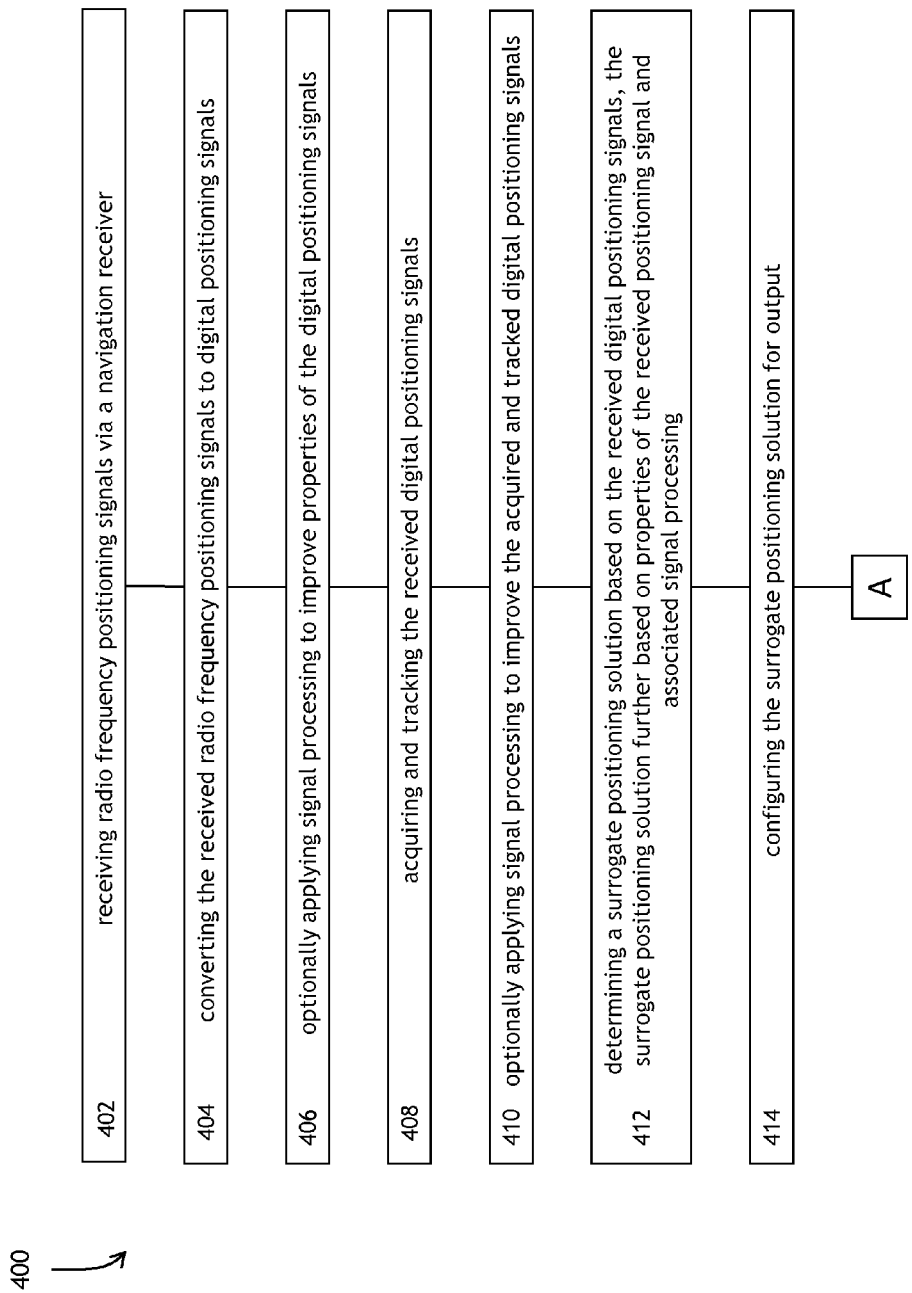
FIGS. 4A and 4B are a flow chart of a method for transferring a positioning solution from a surrogate positioning system to a host positioning system illustrative of an embodiment of the present invention.
Figure 4B:
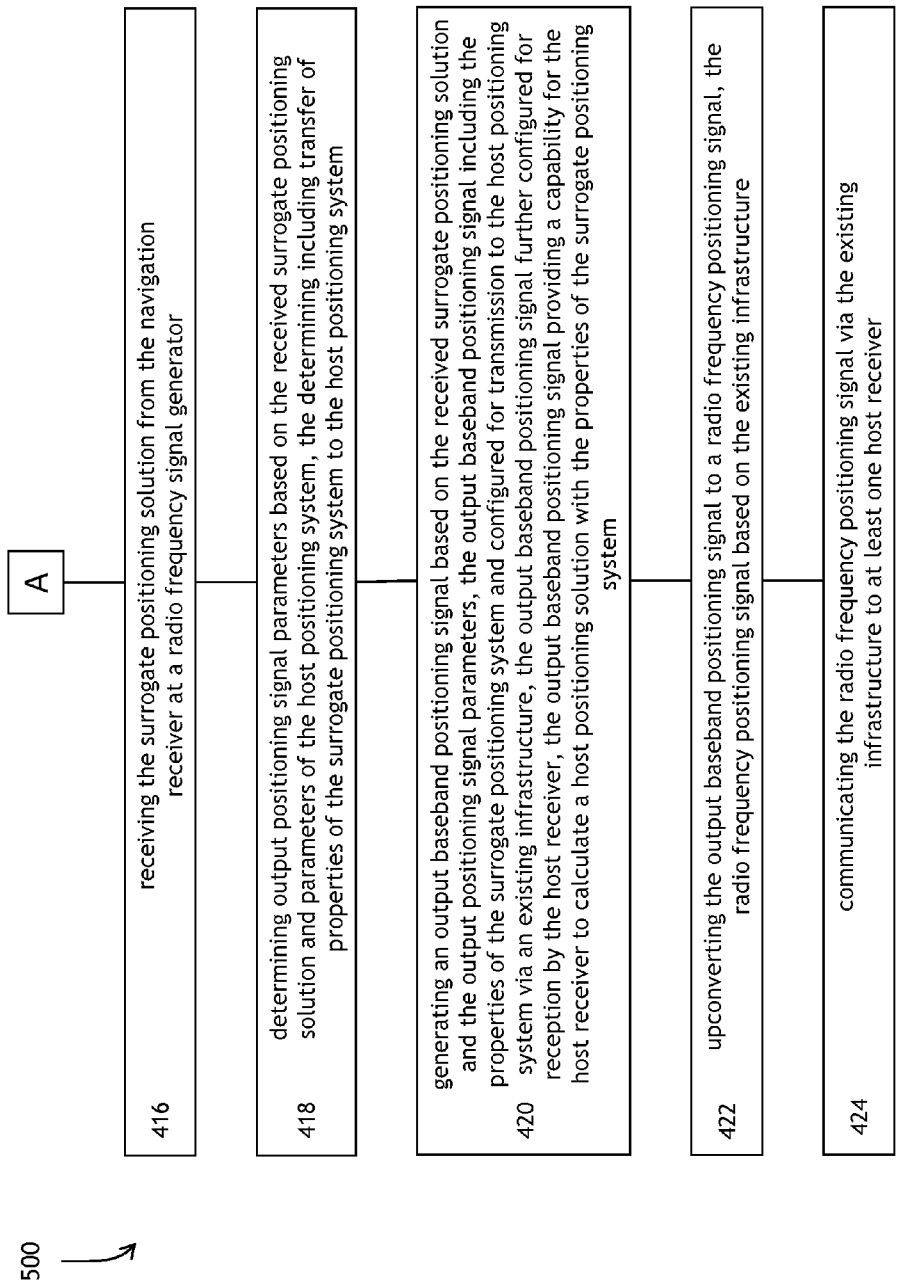

Referring to FIGS. 4A and 4B, a flow chart of a method for transferring a positioning solution from a surrogate positioning system to a host positioning system illustrative of an embodiment of the present invention is shown. Method 400 may comprise, at step 402 with receiving radio frequency positioning signals via a navigation receiver, and, at step 404, converting the received radio frequency positioning signals to digital positioning signals, and, at step 406, optionally applying signal processing to improve properties of the digital positioning signals, and, at step 408, acquiring and tracking the received digital positioning signals, and, at step 410, optionally applying signal processing to improve the acquired and tracked digital positioning signals, and, at step 412, determining a surrogate positioning solution based on the received digital positioning signals, the surrogate positioning solution further based on properties of the received positioning signal and associated signal processing, and, at step 414, configuring the surrogate positioning solution for output. Method 400 continues at step 416, with receiving the surrogate positioning solution from the navigation receiver at a radio frequency signal generator, and, at step 418 determining output positioning signal parameters based on the received surrogate positioning solution and parameters of the host positioning system, the determining including transfer of properties of the surrogate positioning system to the host positioning system, and, at step 420, generating an output baseband positioning signal based on the received surrogate positioning solution and the output positioning signal parameters, the output baseband positioning signal including the properties of the surrogate positioning system and configured for transmission to the host positioning system via an existing infrastructure, the output baseband positioning signal further configured for reception by the host receiver, the output baseband positioning signal providing a capability for the host receiver to calculate a host positioning solution with the properties of the surrogate positioning system, and, at step 422, upconverting the output baseband positioning signal to a radio frequency positioning signal, the radio frequency positioning signal based on the existing infrastructure, and at step 424, communicating the radio frequency positioning signal via the existing infrastructure to at least one host receiver.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A surrogate positioning system for transferring a positioning solution to a host positioning system, comprising:
   a navigation receiver configured for:
      receiving radio frequency positioning signals;
      converting the received radio frequency positioning signals to digital positioning signals;
      applying signal processing to improve properties of the digital positioning signals;
      acquiring and tracking the received digital positioning signals;
      applying signal processing to improve the acquired and tracked digital positioning signals;
      determining a surrogate positioning solution based on the received digital positioning signals, the surrogate positioning solution further based on properties of the received positioning signal and associated signal processing;
      configuring the surrogate positioning solution for output;
   a radio frequency signal generator configured for;
      receiving the surrogate positioning solution from the navigation receiver;
      determining output positioning signal parameters based on the received surrogate positioning solution and parameters of the host positioning system, the determining including a transfer of properties of the surrogate positioning system to the host positioning system;
      generating an output baseband positioning signal based on the received surrogate positioning solution and the output positioning signal parameters, the output baseband positioning signal including the properties of the surrogate positioning system and configured for transmission to the host positioning system via an existing infrastructure, the output baseband positioning signal further configured for reception by the host receiver, the output baseband positioning signal providing a capability for the host receiver to calculate a host positioning solution with the properties of the surrogate positioning system;
      upconverting the output baseband positioning signal to a radio frequency positioning signal, the radio frequency positioning signal based on the existing infrastructure; and
      communicating the radio frequency positioning signal via the existing infrastructure to at least one host receiver.

2. The surrogate positioning system of claim 1, wherein the existing infrastructure is coaxial cable routed within a vehicle.

3. The surrogate positioning system of claim 1, wherein the received radio frequency positioning signals are at least one of: a Global Positioning System signal, a GLONASS signal, an external augmentation system signal, a Galileo signal, a BeiDou Satellite Navigation System signal, a COMPASS, an Indian Regional Navigational Satellite System signal and a Quasi-Zenith Satellite System signal.

4. The surrogate positioning system of claim 1, wherein the navigation receiver is further configured for coherently processing multiple radio frequency signal threads in an anti-jam mode through adaptive nulling and digital beamsteering.

5. The surrogate positioning system of claim 1, wherein the output positioning signal parameters further comprise at least one of: a frequency, a frequency band, a power level, a modulation, a bandwidth, a Frequency Division Multiple Access (FDMA), a Code Division Multiple Access (CDMA), a Time Division Multiple Access (TDMA) and a Pseudo Random Noise (PRN) sequence.

6. The surrogate positioning system of claim 1, wherein the navigation receiver is further configured for anti-tamper, the navigation receiver is further configured for decoding a cryptographic signal.

7. The surrogate positioning system of claim 1, wherein the at least one host receiver is further configured to determine a host positioning solution based on signals from at least one of: the Global Positioning System, the GLONASS, the external augmentation system, the Galileo, the BeiDou Satellite Navigation System, the COMPASS, the Indian Regional Navigational Satellite System signal and the Quasi-Zenith Satellite System signal.

8. The surrogate positioning system of claim 1, wherein the navigation receiver is further configured for signal processing including at least one anti-spoofing technique.

9. A method for transferring a positioning solution from a surrogate positioning system to a host positioning system, comprising:
   receiving radio frequency positioning signals via a navigation receiver;
   converting the received radio frequency positioning signals to digital positioning signals;
   applying signal processing to improve properties of the digital positioning signals;
   acquiring and tracking the received digital positioning signals;
   applying signal processing to improve the acquired and tracked digital positioning signals;
   determining a surrogate positioning solution based on the received digital positioning signals, the surrogate positioning solution further based on properties of the received positioning signal and associated signal processing;
   configuring the surrogate positioning solution for output;
   receiving the surrogate positioning solution from the navigation receiver via a radio frequency signal generator;
   determining output positioning signal parameters based on the received surrogate positioning solution and parameters of the host positioning system, the determining including a transfer of properties of the surrogate positioning system to the host positioning system;
   generating an output baseband positioning signal based on the received surrogate positioning solution and the output positioning signal parameters, the output baseband positioning signal including the properties of the surrogate positioning system and configured for transmission to the host positioning system via an existing infrastructure, the output baseband positioning signal further configured for reception by the host receiver, the output baseband positioning signal providing a capability for the host receiver to calculate a host positioning solution with the properties of the surrogate positioning system;

upconverting the output baseband positioning signal to a radio frequency positioning signal, the radio frequency positioning signal based on the existing infrastructure; and communicating the radio frequency positioning signal via the existing infrastructure to at least one host receiver.

10. The method for transferring a positioning solution from a surrogate positioning system to a host positioning system of claim 9, wherein the existing infrastructure is coaxial cable routed within a vehicle.

11. The method for transferring a positioning solution from a surrogate positioning system to a host positioning system of claim 9, wherein the received radio frequency positioning signals are at least one of: a Global Positioning System signal, a GLONASS signal, an external augmentation system signal, a Galileo signal, a BeiDou Satellite Navigation System signal, a COMPASS, an Indian Regional Navigational Satellite System signal and a Quasi-Zenith Satellite System signal.

12. The method for transferring a positioning solution from a surrogate positioning system to a host positioning system of claim 9, wherein the navigation receiver is further configured for coherently processing multiple radio frequency signal threads in an anti-jam mode through adaptive nulling and digital beamsteering.

13. The method for transferring a positioning solution from a surrogate positioning system to a host positioning system of claim 9, wherein the output positioning signal parameters further comprise at least one of: a frequency, a frequency band, a power level, a modulation, a bandwidth, a Frequency Division Multiple Access (FDMA), a Code Division Multiple Access (CDMA), a Time Division Multiple Access (TDMA) and a Pseudo Random Noise (PRN) sequence.

14. The method for transferring a positioning solution from a surrogate positioning system to a host positioning system of claim 9, wherein the navigation receiver is further configured for anti-tamper, the navigation receiver is further configured for decoding a cryptographic signal.

15. The method for transferring a positioning solution from a surrogate positioning system to a host positioning system of claim 9, wherein the at least one host receiver is configured to determine a host positioning solution based on signals from at least one of: the Global Positioning System, the GLONASS, the external augmentation system, the Galileo, the BeiDou Satellite Navigation System, the COMPASS, the Indian Regional Navigational Satellite System signal and the Quasi-Zenith Satellite System signal.

16. An apparatus for transferring a positioning solution from a surrogate positioning system to a host positioning system, comprising:

means for receiving radio frequency positioning signals;

means for converting the received radio frequency positioning signals to digital positioning signals;

means for applying signal processing to improve properties of the digital positioning signals;

means for acquiring and tracking the digital positioning signals;

means for applying signal processing to improve the acquired and tracked digital positioning signals;

means for determining a surrogate positioning solution based on the digital positioning signals, the surrogate positioning solution further based on properties of the digital positioning signal and associated signal processing;

means for determining output positioning signal parameters based on the surrogate positioning solution and parameters of a host positioning system, the determining including a means for a transfer of properties of the surrogate positioning solution to a host positioning solution;

means for generating an output baseband positioning signal based on the surrogate positioning solution and the output positioning signal parameters, the output baseband positioning signal including the properties of the surrogate positioning solution and configured for transmission to the host positioning system, the output baseband positioning signal further configured for reception by the host positioning system, the output baseband positioning signal configured for providing a capability for the host positioning system to calculate a host positioning solution with the properties of the surrogate positioning solution;

means for upconverting the output baseband positioning signal to a radio frequency positioning signal, the radio frequency positioning signal based on the host positioning system; and means for communicating the radio frequency positioning signal to at least one host positioning system.

17. The method for transferring a positioning solution from a surrogate positioning system to a host positioning system of claim 16, wherein the received radio frequency positioning signal is at least one of: a Global Positioning System signal, a GLONASS signal, an external augmentation system signal, a Galileo signal, a BeiDou Satellite Navigation System signal, a COMPASS, an Indian Regional Navigational Satellite System signal and a Quasi-Zenith Satellite System signal.

18. The method for transferring a positioning solution from a surrogate positioning system to a host positioning system of claim 16, wherein the means for downconverting further comprises: means for processing multiple radio frequency signal threads in an anti-jam mode through an adaptive nulling means and digital beamsteering means.

19. The method for transferring a positioning solution from a surrogate positioning system to a host positioning system of claim 16, wherein the output positioning signal parameters further comprise at least one of: a frequency, a frequency band, a power level, a modulation, a bandwidth, a Frequency Division Multiple Access (FDMA), a Code Division Multiple Access (CDMA), a Time Division Multiple Access (TDMA) and a Pseudo Random Noise (PRN) sequence.

20. The method for transferring a positioning solution from a surrogate positioning system to a host positioning system of claim 16, wherein the host positioning system further comprises: means for receiving and determining a host positioning solution based on signals from at least one of: the Global Positioning System, the GLONASS, the external augmentation system, the Galileo, the BeiDou Satellite Navigation System, the COMPASS, the Indian Regional Navigational Satellite System signal and the Quasi-Zenith Satellite System signal.

* * * * *